324-
SEARCH ROOM
Nov. 10, 1964 A. L. WHITWELL ETAL 3,156,867
ELECTRIC SIGNAL SPECTRUM ANALYSERS INCLUDING
AUTOMATIC FREQUENCY CONTROL
Filed Sept. 19, 1960
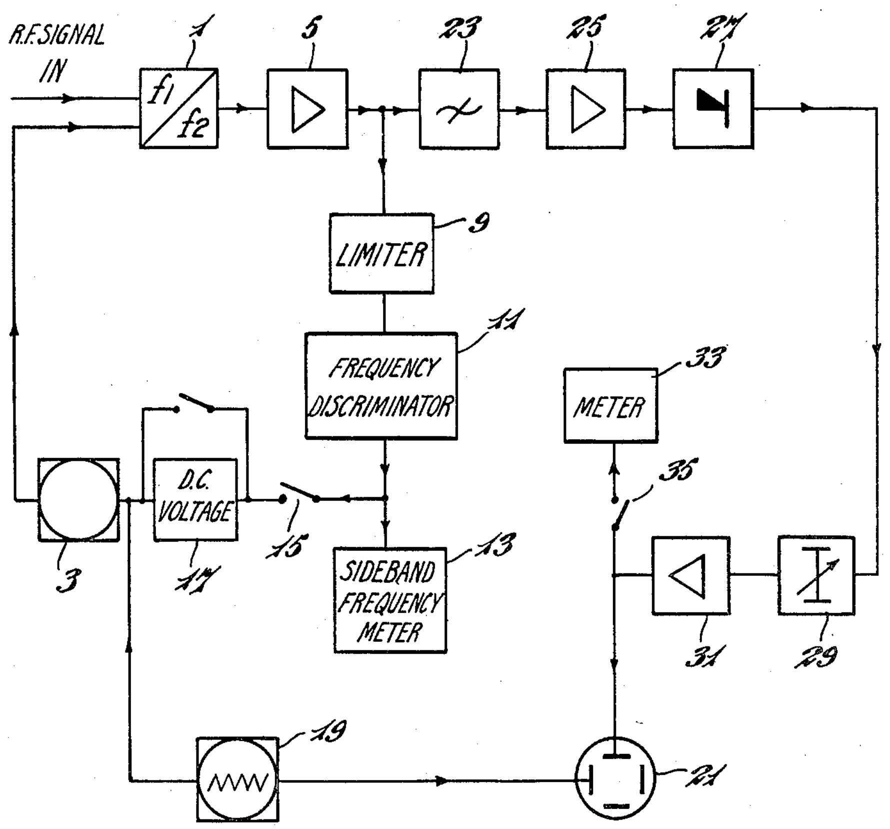

3,156,867

ELECTRIC SIGNAL SPECTRUM ANALYSERS INCLUDING AUTOMATIC FREQUENCY CONTROL

Arthur Leslie Whitwell, Norman Williams, and Alexander Ian McPhedran, Glasgow, Scotland, assignors to James Scott and Company (Electrical Engineers) Limited, Glasgow, Scotland

Filed Sept. 19, 1960, Ser. No. 56,740
9 Claims. (Cl. 324—77)

The present invention relates to electric signal spectrum analysers, and particularly to spectrum analysers operating on the superheterodyne principle.

An object of the present invention is to provide a spectrum analyser which can examine the spectrum of an R.F. signal in the region of the carrier frequency.

Accordingly the present invention provides an R.F. signal spectrum analyser comprising a mixer arranged to receive the signal to be analysed and the signal from a local oscillator, the intermediate frequency signal output from the mixer passing to a broadband intermediate frequency amplifier from which the output is supplied both to a display circuit and to a frequency discriminator arranged to give a direct voltage output of which the amplitude corresponds to the mean frequency of the discriminator input signal, this voltage output being supplied to the local oscillator to vary its frequency output so as to maintain the intermediate frequency signal constant.

One example of the present invention is illustrated in the accompanying schematic drawing.

In this circuit the R.F. signal input is applied to a mixer 1 which also receives a signal from a klystron local oscillator 3. The I.F. signal output from the mixer is applied to a broadband amplifier 5 from which the output passes to a display circuit and to a limiter 9. The signal from the limiter passes on to a frequency discriminator 11 which gives a direct voltage output of which the amplitude corresponds to the frequency of the discriminator input.

The direct voltage output is applied to a meter 13 and, through an on/off switch 15, to a source of variable direct voltage 17 so that the combined voltage is applied to the reflector of the klystron of the local oscillator 3.

A saw-tooth voltage generator 19 is arranged to supply a voltage of saw-tooth wave-form to the local oscillator and to the Y-plates of a cathode ray oscilloscope 21, forming part of the display circuit.

The remainder of the display circuit in series with the output of the broadband I.F. amplifier 5 is a narrow band pass crystal filter 23, an amplifier 25, a detector 27, a variable attenuator 29 and a D.C. amplifier 31 of which the output passes to the X plates of the C.R.O. 21 and optionally to a meter 33 by movement of a switch 35.

The above apparatus can be applied to the analysis of signals at X-band frequencies, e.g. in the region of 9 kmc./s., the intermediate frequency being 10.7 mc./s. The amplifier 5 has a band-width of 1.5 mc./s. centred 10.7 mc./s. Any R.F. frequency can be analysed provided that a suitable A.F.C. loop can be arranged.

The crystal filter 23 has a bandwidth of 1 kc./s. centred on 10.7 mc./s.

The saw-tooth generator 19 is able to generate either a 5 c./s. sweep voltage or a 25 c./s. sweep voltage.

In use—the local oscillator 3 is operated at a frequency 10.7 mc./s. below the signal frequency. The I.F. output from the amplifier 5 is fed to the frequency discriminator 11 to generate a direct voltage which is supplied to the local oscillator through the switch 15, there being no additional direct voltage injected. Upon the input signal increasing in frequency the frequency of the output from the amplifier increases and consequently the direct voltage from the frequency discriminator 11 changes so as to increase the local oscillator frequency to reduce the I.F. to its desired value of 10.7 mc./s.

The calibrated D.C. voltage applied by the source 17 acts to vary the frequency of the local oscillator to permit analysis of the signal spectrum at different parts of the spectrum.

When using a visual representation on the C.R.O. 21 a saw-tooth voltage is applied to the local oscillator to cause it to sweep through a selected frequency range.

For a 5 c./s. sweep the local oscillator is swept over a range of 250 kc./s. of the spectrum, and for a 25 c./s. sweep the local oscillator is swept over a range of 25 kc./s.

The saw-tooth voltage generator is applied simultaneously to the X-plates of the C.R.O. 21 to achieve synchronism of the display.

The operation of the remainder of the spectrum analyser is as usual. The crystal filter 23 only passes on signals of 10.7 mc./s. to the detector, the output from which is applied to the display unit. Therefore as the local oscillator is swept over its frequency range the I.F. signal is examined for any signals of frequency 10.7 mc./s. A different part of the signal spectrum can be examined by injecting a calibrated D.C. voltage from the source 17.

The frequency discriminator generates a correcting voltage which attempts to restore the I.F. signal, generated from the ingoing carrier, 10.7 mc./s. It is, however, offset from this figure by the effect of the variable direct voltage on the A.F.C. circuit.

The attenuator 29 can be used to measure the amplitude of sidebands relative to the carrier. Decrease of attenuation permits the latter stages of the amplifier 25 to saturate when the carrier is passing through the filter 23, but the amplifier recovers so that full gain is available by the time the frequency sweep has altered conditions so that the sideband to be measured is passing through the filter.

It is possible to calibrate the panoramic scale of the C.R.O. for frequency and amplitude by injecting a signal from a separate variable oscillator which covers the range of frequencies of interest, e.g. of 1–125 kc./s. This frequency modulates the local oscillator and produces marker blips on the trace on either side of the displayed carrier signal. The amplitude modulation is carried out in conjunction with a variable standard attenuator.

It is possible to confirm the operation of the attenuator by applying an input signal which is frequency modulated. Increase of the modulation produces successive nulls of the carrier and sidebands and at any of the null points high order sidebands can be measured to check thereby the attenuator operation.

The use of the automatic frequency control loop including the frequency discriminator operating at intermediate frequencies permits the output per cycle of frequency shift to be higher than that for an R.F. system and permits the range of input carrier frequency to be limited only by the bandwidth of the R.F. components and the frequency range of the local oscillator.

We claim:

1. A microwave signal spectrum analyser including a mixer arranged to receive a signal to be analysed, a local oscillator connected to said mixer so as to derive an intermediate frequency when the output of the oscillator is combined with the signal, a broad band intermediate frequency amplifier connected to the output of the mixer and receiving said intermediate frequency, a display and measuring circuit, a narrow band intermediate frequency amplifier, means connecting the output of said broad band intermediate frequency amplifier to the display and measuring circuit through the narrow band intermediate frequency amplifier, an automatic frequency control circuit interconnected between the output of the broad band intermediate frequency amplifier and the input of said local oscillator, said automatic frequency control circuit including a frequency discriminator supplied by said intermediate frequency and furnishing a direct voltage output of an amplitude corresponding to the frequency of the discriminator input signal, and means to apply said direct discriminator output voltage directly to said local oscillator input to vary the local oscillator output frequency so as to maintain the intermediate frequency substantially constant, an independently operative source of direct voltage of sawtooth wave form, and means connecting the output of said sawtooth voltage source directly to said local oscillator input, the sawtooth frequency thus being maintained constant independently of the nature of the analyzed signal, and the actual amplitude of said sawtooth voltage being compensated by the output voltage of said discriminator so that the respective output voltage of said local oscillator complements the respective signal to be analysed in such a manner that the output of said mixer corresponds to said intermediate frequency.

2. A spectrum analyser as claimed in claim 1, in which means are provided to supply a variable direct voltage to the local oscillator in addition to that supplied by the frequency discriminator.

3. A spectrum analyser as claimed in claim 2, in which the direct voltage supply means includes a manually-adjustable potentiometer.

4. A spectrum analyser as claimed in claim 1, in which the saw-tooth voltage source is able to supply either of two voltages of different frequency with amplitudes such as to effect scanning ranges in approximately inverse proportion to the frequencies of the two voltages.

5. A spectrum analyser as claimed in claim 1, in which a meter is connected to the output of the frequency discriminator.

6. A spectrum analyser as claim in claim 1, in which the display circuit includes a detector, a variable attenuator, a direct voltage amplifier and a visual display device.

7. A spectrum analyser as claimed in claim 6, in which the visual display device is a meter.

8. A spectrum analyser as claimed in claim 6, in which the visual display device is a cathode ray oscilloscope, the signals from the direct voltage amplifier being applied to one set of deflector plates.

9. A spectrum analyser as claimed in claim 8, in which the saw tooth voltage is applied to the other set of deflector plates.

References Cited in the file of this patent

UNITED STATES PATENTS

| | | |
|---|---|---|
| 2,287,925 | White | June 30, 1942 |
| 2,434,294 | Grinzton | Jan. 13, 1948 |
| 2,496,360 | Raymond | Feb. 7, 1950 |
| 2,632,036 | Hurwitz | Mar. 17, 1953 |
| 2,753,524 | Newson | July 3, 1956 |
| 2,798,946 | Howery et al. | July 9, 1957 |
| 2,933,598 | Heller et al. | Apr. 19, 1960 |
| 2,951,150 | Rennenkampf | Aug. 30, 1960 |

OTHER REFERENCES

"Microwave Spectrum Analyzers," article in Tele-Tech (III), April 1947, pages 35–38.

RF Spectrum Analyer, article in Tele-Tech (I), July 1948, pages 30 and 31.

Radio-Frequency Wave Analyzer, article in Tele-Tech (II), December 1950, pages 37–40.